US009194241B2

(12) United States Patent
Beaujard et al.

(10) Patent No.: US 9,194,241 B2
(45) Date of Patent: Nov. 24, 2015

(54) CMC TURBINE NOZZLE ADAPTED TO SUPPORT A METALLIC TURBINE INTERNAL CASING BY A RADIAL CONTACT

(75) Inventors: Antoine Jean-Philippe Beaujard, Vaux-le-Penil (FR); Gilles Alain Charier, La Grande Paroisse (FR); Jean Pierre Mareix, Chartrettes (FR); Didier Fabre, Avon (FR)

(73) Assignee: SNECMA, Paris (FR)

( * ) Notice: Subject to any disclaimer, the term of this patent is extended or adjusted under 35 U.S.C. 154(b) by 689 days.

(21) Appl. No.: 13/435,910

(22) Filed: Mar. 30, 2012

(65) Prior Publication Data
US 2012/0251314 A1 Oct. 4, 2012

(30) Foreign Application Priority Data

Mar. 30, 2011 (FR) ...................... 11 52635

(51) Int. Cl.
*F01D 1/02* (2006.01)
*F01D 5/28* (2006.01)
*F01D 9/06* (2006.01)
*F01D 25/24* (2006.01)

(52) U.S. Cl.
CPC ................ *F01D 5/282* (2013.01); *F01D 9/065* (2013.01); *F01D 25/246* (2013.01); *F05D 2300/603* (2013.01); *Y02T 50/672* (2013.01)

(58) Field of Classification Search
CPC .................................. F01D 9/042; F01D 11/18
USPC .............. 415/200, 209.3, 209.2, 209.4, 210.1
See application file for complete search history.

(56) References Cited

U.S. PATENT DOCUMENTS

| 5,049,035 A | * | 9/1991 | Marlin ...................... 416/193 A |
| 6,163,959 A | * | 12/2000 | Arraitz et al. ................ 29/889.1 |
| 2011/0008163 A1 | | 1/2011 | Prentice |
| 2012/0027572 A1 | * | 2/2012 | Denece et al. ................ 415/127 |

FOREIGN PATENT DOCUMENTS

WO    WO 2010/103213 A1    9/2010

OTHER PUBLICATIONS

Walker and Hodges, "Comparing Metal-Ceramic Brazing Methods", Brazing and Soldering Today, Oct. 2008.*

(Continued)

*Primary Examiner* — Dwayne J White
*Assistant Examiner* — Jason Fountain
(74) *Attorney, Agent, or Firm* — Oblon, McClelland, Maier & Neustadt, L.L.P.

(57) ABSTRACT

A composite material turbine nozzle blade including an airfoil adapted to have a cooling fluid flow through it and extending between a shroud and a root is provided. The shroud is shaped to be attached to one or more turbine casings of a turbomachine and the root is shaped to provide a junction with a turbine internal casing. The root is produced with a loosened texture and includes an external upstream side loosened texture lug and an external downstream side loosened texture lug. The ends of the two external side lugs extend radially relative to the rotation axis of the turbomachine to form a device for supporting and centering the internal casing.

9 Claims, 1 Drawing Sheet

(56) References Cited

OTHER PUBLICATIONS

U.S. Appl. No. 13/435,754, filed Mar. 30, 2012, Beaujard, et al.

French Preliminary Search Report and Written Opinion issued on Nov. 21, 2011 in corresponding French Application No. 11 52635 filed on Mar. 30, 2011 (with an English Translation of Categories).

\* cited by examiner

CMC TURBINE NOZZLE ADAPTED TO SUPPORT A METALLIC TURBINE INTERNAL CASING BY A RADIAL CONTACT

BACKGROUND OF THE INVENTION

The field of the present invention is that of turbomachines, more particularly that of turbomachine low-pressure turbine nozzles. It relates more precisely to a ceramic matrix composite (CMC) material turbine nozzle. CMC materials are typically formed of a fibrous reinforcement of refractory fibers, such as carbon or ceramic fibers, densified by a ceramic or at least partially ceramic matrix.

DESCRIPTION OF THE PRIOR ART

Modern turbomachines are conventionally produced in the form of an assembly of modules including either mobile parts or fixed parts. They comprise firstly, starting from the upstream end, one or more compressor modules disposed in series that compress air aspirated into an air inlet. The air is then introduced into a combustion chamber where it is mixed with a fuel and burned. The combustion gases pass through one or more turbine modules that drive the compressor or compressors. The gases are finally ejected either into a nozzle to produce a propulsion force or onto a free turbine to produce power that is recovered on a transmission shaft.

The turbomachine generally includes at the exit from the combustion chamber a set of fixed blades also known as a high-pressure turbine nozzle, enabling straightening of the flow of gases in the direction of a mobile high-pressure turbine wheel; it is generally followed, in the downstream direction, by a fixed low-pressure nozzle that straightens the flow at the exit from the high-pressure turbine toward a mobile low-pressure turbine wheel.

The low-pressure turbine nozzle blades are solid parts including an airfoil extending between a shroud and a root positioned at its upper and lower ends; they are generally provided with dedicated cooling, which is to the detriment of the energy balance of the engine. At present low-pressure nozzles are produced in metal alloys, which necessitates cooling them. For this purpose cooling air flows through them that is then directed toward turning parts cooling injectors. A high flow of air therefore passes through the nozzle, since it must enable both cooling of the nozzle and feeding of the injectors. The flow of cooling air degrades the performance of the engine since it is obtained to the detriment of the power delivered by the engine.

Improving performance and reducing polluting emissions leads moreover to envisaging ever higher combustion temperatures, imposing ever higher stresses on the hot portions of turbomachines, i.e. the parts situated downstream of the combustion chamber. It is then desirable to use CMC materials as much as possible for the fixed parts because of their very good thermal and structural properties. CMC parts have the advantage of combining beneficial mechanical properties, making them suitable for the production of structural elements, with that of retaining these mechanical properties at high temperatures.

To limit the impact on the low-pressure nozzles in terms of mass and flow of air, the use of CMC materials on the one hand enables the mass of the nozzle to be limited, because of their low density, and on the other hand their cooling to be eliminated or at least very greatly reduced, because of their good temperature resistance. However, integrating a CMC material is technologically difficult because it expands less than the metals around it.

CMC low-pressure nozzles have been designed, one example of which is given in patent application No. FR 1059315 in the name of the applicant. The corresponding device comprises CMC nozzle airfoils and a metal turbine internal casing, the two parts being attached to an external metal collar by means of a tube that has a function of guiding the flow cooling the internal casing in addition to this structural support function.

The drawbacks of this solution are, firstly, that too much of a structural function is imparted to the tube supplying the cooling air, which complicates its production, and, secondly, centering of the internal casing is poor because of the great length of this tube. It has therefore appeared beneficial to separate these two functions and for the cooling tube to retain only the function of supplying the internal casing with cooling air, the function of retaining the internal casing then being transferred to another part.

SUMMARY OF THE INVENTION

An object of the present invention is to remedy the drawbacks of the prior art devices by proposing a ceramic matrix composite material low-pressure turbine nozzle that necessitates no or little cooling flow and that is mechanically compatible with the metal parts around it.

To this end, the invention consists in a composite material turbine nozzle blade including an airfoil adapted to have a cooling fluid flow through it and extending between a shroud and a root, said shroud being shaped to be fixed to one or more turbine casings of a turbomachine and said root being shaped to provide a junction with a turbine internal casing so as to transfer said cooling fluid to said internal casing, wherein its root is produced with a loosened texture and includes, on the one hand, a loosened texture lug on the internal upstream side and a loosened texture lug on the internal downstream side, the two lugs on the internal side shaping the flow of gas and, on the other hand, a loosened texture lug on the external upstream side and a loosened texture lug on the external downstream side, the ends of the two lugs on the external side extending radially relative to the rotation axis of the turbomachine to form means for supporting and centering said internal casing.

The radial orientation of the external lower loosened texture lugs enables the internal casing to be allowed to expand in use by providing it with flanges that are also oriented radially. This ensures the compatibility of a CMC part like the low-pressure nozzle with a metallic internal casing.

The shroud is advantageously produced with a loosened texture and includes, on the one hand, a loosened texture lug on the internal upstream side and a loosened texture lug on the internal downstream side, the two lugs on the internal side shaping the gas stream and, on the other hand, a loosened texture lug on the external upstream side and a loosened texture lug on the external downstream side, the two external lugs being adapted to fix said blade to the structure of the turbomachine. The similar shapes of the root and the shroud facilitate their production.

In one particular embodiment the airfoil is hollow and the shroud and the root are pierced by a hole to provide a passage for a cooling tube intended to route cooling air to the internal casing.

The invention also relates to a turbine nozzle constituted by an assembly of blades as described hereinabove.

It relates further to an assembly constituted of a turbine nozzle as described hereinabove and a metallic turbine internal casing, said internal casing including two radially oriented flanges shaped to support it and to center it through cooperation with the external lower loosened texture lugs of the blades of said nozzle.

In such an assembly, the internal casing advantageously further includes a longitudinal extension shaped to form a radial abutment for one of the external lower lugs of at least one nozzle blade and to allow relative movement in the axial direction between the blade and the internal casing by virtue of their differential expansion.

The invention also relates to an assembly constituted of a turbine nozzle constituted by an assembly of blades as described above, a metallic turbine casing, said internal casing including two radially oriented flanges shaped to support and center it through cooperation with the external lower loosened texture lugs of the blades of said nozzle, and at least one cooling tube passing through said holes of a blade, the internal casing further including means for retaining said tube in the axial and circumferential directions and allowing a degree of freedom to said tube in translation in the radial direction.

In such an assembly, the internal casing advantageously further includes a longitudinal extension shaped to form a radial abutment for one of the external lower lugs of at least one nozzle blade and to allow relative movement in the axial direction between the blade and the internal casing by virtue of their differential expansion.

The invention relates finally to a turbomachine turbine module including an assembly as described hereinabove and to a turbomachine including such a module.

BRIEF DESCRIPTION OF THE DRAWINGS

The invention will be better understood and other objects, details, features and advantages thereof will become more clearly apparent in the course of the following detailed explanatory description of one embodiment of the invention given by way of illustrative and nonlimiting example only with reference to the appended diagrammatic drawing.

In the drawing.

DESCRIPTION OF PREFERRED EMBODIMENTS

In the remainder of the description the terms axial and radial relate to the direction of the rotation axis of the turbomachine. For their part, the terms upstream and downstream refer to the direction of flow of the air or burned gases in the gas stream of this turbomachine, as represented by thick arrows in FIG. 1. The terms upper and lower relate to the greater or lesser radial distance of the element concerned. Finally, the terms external and internal refer to a greater or lesser distance from the median axis of the gas stream.

Figure 1:
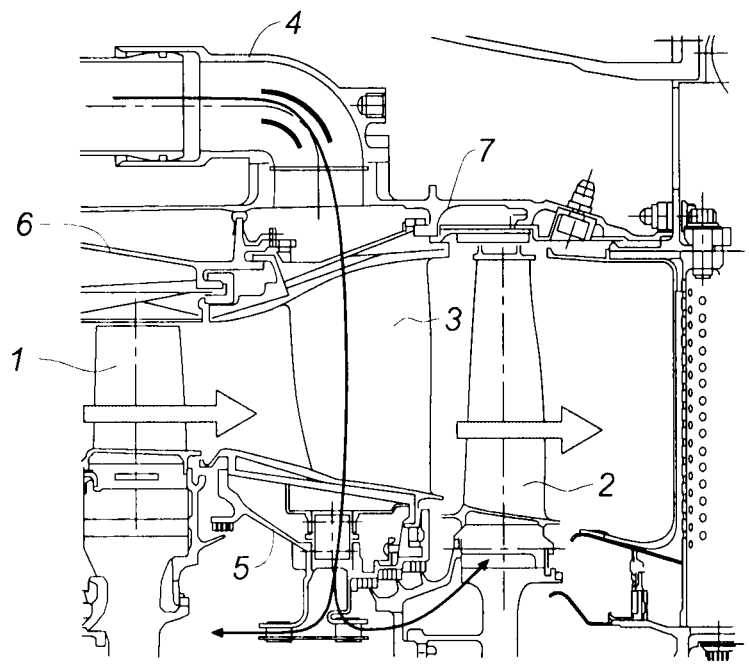
FIG. 1 is a general view in section of a turbine module showing a low-pressure nozzle in its environment.

Referring to FIG. 1, there are seen the principal components of the hot parts of a turbomachine comprising a high-pressure turbine blade 1 and a low-pressure turbine blade 2 between which is a low-pressure turbine nozzle blade 3. These hot parts also comprise a high-pressure turbine nozzle, not shown, upstream of the high-pressure blade 1.

The low-pressure nozzle blade 3 is fixed by its upper part to structural parts referred to as the high-pressure turbine casing 6 and the low-pressure turbine casing 7 by means of hooks integrating in grooves provided for this purpose on said turbine casings. This nozzle blade is hollow to provide a passage for air necessary for cooling the low-pressure turbine internal casing and the high-pressure turbine mobile blades 1 and low-pressure turbine mobile blades 2. Because of its CMC structure, it does not need cooling and therefore has no perforations on the surface of its airfoil, which is swept by the flow of hot gases of the turbomachine.

A cooling pipe 4 leading from an air bleed on the compressor is fixed facing the upper end of the nozzle to feed the various portions of the hot parts with cooling air. These parts include a turbine internal casing 5 the function of which is to fasten together the roots of the low-pressure nozzle blades 3 and to direct the cooling air toward the mobile turbine blades 1 and 2. The cooling air therefore flows from the cooling pipe 4 via the interior of the airfoil of the turbine nozzle 3 toward the turbine internal casing 5, which it cools, and is then divided to flow through the cooling internal cavities of the mobile blades 1 and 2. It is then re-injected into the flow through the cooling orifices of those blades.

Figure 2:
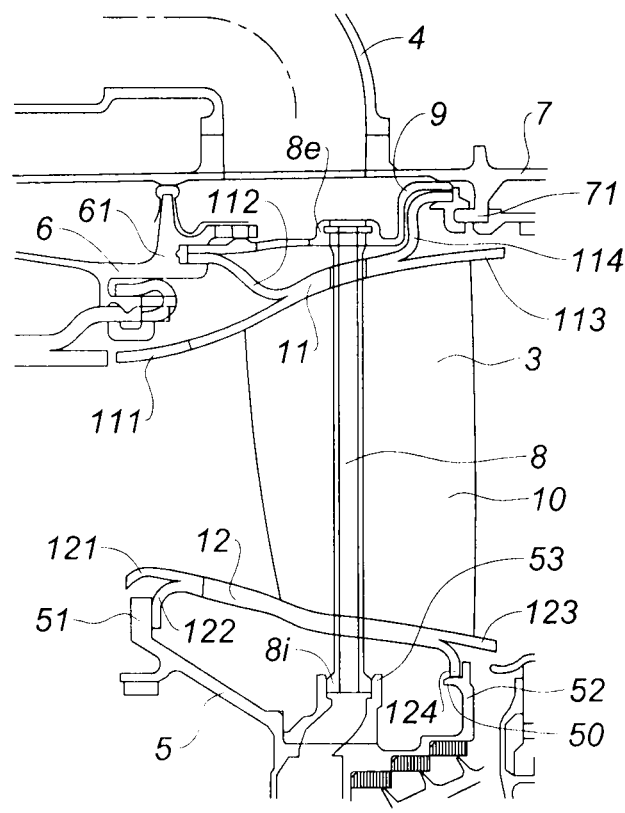
FIG. 2 is a view in section of a low-pressure turbine nozzle of one embodiment of the invention.

Referring now to FIG. 2, there is seen a low-pressure turbine nozzle blade 3 including an airfoil 10 for straightening the flow of gas at the outlet from the high-pressure turbine blade wheel 1 before it enters the low-pressure turbine wheel 2. This airfoil is extended in its upper portion by a shroud 11 and in its lower portion by a root 12. The nozzle blade 3 is produced entirely from a CMC material and thus has no perforations on its airfoil 10 for evacuating the cooling air, the material used being sufficiently resistant to high temperatures and having no need to be swept by a cooling film. The shroud 11 and root 12 are also produced from a CMC material in one piece with the airfoil 10, with a loosened texture on the upstream and downstream sides of the shroud or root. A loosened texture is characterized by a separation within its thickness of the layer of fibers forming the shroud or root to form two distinct layers, called loosened texture lugs, that diverge radially relative to each other whilst remaining connected by the ceramic matrix. The shroud and root thus have, both on their upstream side and on their downstream side, two loosened texture lugs, one reconstituting the flow of gas upstream or downstream of the airfoil 10 and the other serving either to attach the nozzle blade 3 to the turbine casings or to fix the internal casing 5.

The shroud 11 is divided on the upstream side into two loosened texture lugs, an internal upper upstream lug 111 that forms the upper portion of the flow passage upstream of the airfoil 10 and an external upper upstream lug 112 that is engaged in a hook 61 carried by the high-pressure turbine casing 6 to support the nozzle blade 3 on the upstream side. In the downstream direction it is also divided into two loosened texture lugs, an internal upper downstream lug 113 that forms the upper portion of the flow passage downstream of the airfoil 10 and an external upper downstream portion 114 that is engaged in a hook 71 carried by the low-pressure turbine casing 7 to support the nozzle blade 3 on the downstream side.

In the same way, the root 12 is divided in the upstream direction into two loosened texture lugs, an internal lower upstream lug 121 that forms the lower portion of the flow passage upstream of the airfoil 10 and an external lower upstream lug 122 for centering and axial retention of the internal casing 5 on its upstream side through cooperation with the upstream flange 51 of that internal casing. On the downstream side it is also divided into two loosened texture lugs, an internal lower downstream lug 123 that forms the lower portion of the flow passage downstream of the airfoil 10 and an external lower downstream lug 124 that centers and axially retains the internal casing 5 on its downstream side through cooperation with the downstream flange 52 of this internal casing.

The upstream and downstream external loosened texture lugs enable, on the one hand, positioning of the low-pressure nozzle 3 in its engine environment by the upper lugs 112 and 114, like the metallic nozzle hooks of the prior art, and, on the other hand, retention of the internal casing 5 in position relative to the low-pressure turbine nozzle by the lower lugs 122 and 124.

The two external lower lugs 122 and 124 are bent and assume a radial direction where they are joined to the terminal flanges 51 and 52 of the internal casing 5, which are also radially oriented, to enable sliding of this internal casing on the cylindrical walls formed by said external lower lugs. This configuration accommodates differences in radial expansion that exist between the CMC material low-pressure nozzle and the metallic internal casing 5. The internal casing 5 also includes a longitudinal extension 50 extending in the axial direction along which the external lower lug 124 of the low-pressure nozzle blade 3 can slide for good retention of the internal casing 5 by the low-pressure nozzle 3 despite the different axial expansion of the two parts.

FIG. 2 also shows a cooling tube 8 that passes through the airfoil 10 of the nozzle 3 and conducts cooling air coming from the cooling pipe 4 toward the internal casing 5 and the cooling internal cavities of the mobile blades 1 and 2. This air merely passes through the hollow airfoil 10 without escaping from the tube 8 or cooling the airfoil 10, which is made of CMC to resist the temperature of the gas flow. The upper portion of this cooling tube 8 is supported by a metallic exterior collar 9 that is also supported by the hooks 61 and 71 of the high-pressure turbine casing 6 and the low-pressure turbine casing 7. Its lower portion is simply retained slidably by an extension of the internal casing 5 in the form of a radially oriented chimney 53. The tube 8 has enlargements at both ends, which imparts to it a so-called "dog's bone" shape, to facilitate retaining it in position. The external end 8e is held by a circlip engaged in a groove produced for this purpose in the exterior collar 9, whereas the internal end 8i is merely guided radially by the chimney 53 of the internal casing, in which it is free to expand when it becomes hot. To this end a radial clearance delimited by a shoulder is provided in the chimney 53 to enable expansion of the tube 8 passing through the low-pressure nozzle blade 3 and the internal casing 5.

How the parts of a turbine module including a CMC material low-pressure turbine nozzle conforming to the invention are structurally retained is described next.

The nozzle blade 3 is supported by its external upper loosened texture lugs 112 and 114 that are introduced into the hooks 6 and 7 of the high-pressure and low-pressure turbine casings. This being the case, the internal upper loosened texture lugs 111 and 113 are naturally positioned so as to assure the continuity of the gas stream between the outlet of the wheel of the high-pressure turbine 1 and the inlet of that of the low-pressure turbine 2. Also engaged in these hooks is the exterior collar 9 that supports the cooling tube 8. This exterior collar interlocks with the high-pressure turbine casing 6, which prevents it rotating about the engine axis. An axial clearance is provided between the high-pressure turbine casing 6 and the assembly constituted by the external upper upstream loosened texture lug 112 and the upstream end of the metallic collar 9, so as to enable differential expansion of the CMC material of the low-pressure nozzle and the metal of the exterior collar 9 under thermal load.

The cooling tube 8 is supported by the exterior collar 9 via its circlip and has no rigid connection in its lower portion to the internal casing 5, which eliminates all structural action of this cooling tube. Its fixing to this exterior collar and its passage through holes produced in the shroud 11 of the nozzle 3 nevertheless provides the function of preventing rotation of the nozzle 3 around the axis of the turbomachine. This structural function imparted to the cooling tube 8 is limited, however, the point of application of the loads at the level of the holes in the shroud 11 being close to the point of attachment of the tube to the exterior collar.

The internal casing 5 is positioned and centered on the low-pressure nozzle with no intervention by the cooling tube 8. The upstream and downstream external lower lugs 122, 124 of the low-pressure nozzle blade 3 are respectively pressed onto the upstream and downstream flanges 51, 52 of the internal casing 5, which because of their radial orientation allow the metallic internal casing 5 to expand radially facing the CMC low-pressure nozzle. Moreover, the external lower downstream lug 124 of the low-pressure nozzle blade 3 is positioned radially against the longitudinal extension 50 of the internal casing 5, which assures radial centering of the internal casing on the low-pressure nozzle and allows expansion of the internal casing caused by heating.

In the final analysis, the solution provided by the invention consists in imparting to the low-pressure nozzle a structural function relating to retention and centering of the internal casing 5. The latter is thus retained axially and radially by the CMC low-pressure nozzle; it is also prevented from rotating about the engine axis by the exterior collar 9 via the cooling tube 8.

The invention claimed is:

1. An assembly comprising:
    a turbine nozzle including an assembly of composite material blades and a metallic turbine internal casing, said blades including an airfoil extending between a shroud at an upper radial end thereof and a root at a lower radial end thereof,
    wherein said shroud includes means for attaching the shroud to one or more turbine casings of a turbomachine,
    wherein an upstream end of the root and a downstream end of the root are each produced with a separation within a thickness thereof into two distinct layers of fibers that diverge radially from each other while remaining connected by a ceramic matrix so as to present an internal lower upstream lug and an external lower upstream lug at the upstream end of the root, and an internal lower downstream lug and an external lower downstream lug at the downstream end of the root,
    wherein end portions of the external lower upstream lug and the external lower downstream lug extend radially relative to a rotation axis of the turbomachine and free ends of the external lower upstream lug and the external lower downstream lug extend radially inward, and said turbine internal casing includes upstream and downstream radially oriented flanges, and
    wherein a downstream facing wall of the upstream radially oriented flange cooperates with an upstream facing side of the radially extending end portion of the external lower upstream lug and an upstream facing wall of the downstream radially oriented flange cooperates with a downstream facing side of the radially extending end portion of the external lower downstream lug, one of the walls of the radially oriented flanges abutting with a correspond a side of the radially extending end portion of one of the external lower lugs, to support and center the turbine internal casing.

2. The assembly as claimed in claim 1, wherein ends of the internal lower upstream lug and the internal lower downstream lug shape a gas flow.

3. The assembly as claimed in claim wherein ends of an upstream end of the shroud and a downstream end of the shroud are each produced with a separation within a thickness thereof into two distinct layers of fibers that diverge radially from each other while remaining connected by a ceramic matrix so as to present an internal upper upstream lug and an external upper upstream lug at the upstream end of the shroud, and an internal upper down stream lug and an external upper downstream lug at the downstream end of the shroud, wherein the internal upper upstream lug and the internal upper downstream lug shape a gas flow, and wherein the external upper upstream lug and the external upper downstream lug form said means for attaching the turbine nozzle to said one or more turbine casings of a turbomachine.

4. The assembly as claimed in claim 1, wherein the internal casing includes a longitudinal extension presenting a radial abutment for one of the external lower upstream lug or the external lower downstream lung, the longitudinal extension allowing relative axial movement between the blade and the internal casing due to differential expansion.

5. The assembly as claimed in claim 4, wherein the longitudinal extension is provided on the upstream facing wall of the downstream flange.

6. The assembly as claimed in claim 1, further comprising at least one cooling tube adapted to route cooling air to the internal casing through said shroud and root, wherein in the internal casing includes a device which retains said tube axially and circumferentially and allows translation radially.

7. The assembly as claimed in claim 6, wherein the device which retains the tube includes a radially oriented chimney.

8. A turbomachine turbine module including an assembly as claimed in claim 1.

9. A turbomachine including a turbine module as claimed in claim 8.

\* \* \* \* \*

UNITED STATES PATENT AND TRADEMARK OFFICE
CERTIFICATE OF CORRECTION

PATENT NO. : 9,194,241 B2
APPLICATION NO. : 13/435910
DATED : November 24, 2015
INVENTOR(S) : Antoine Jean-Philippe Beaujard et al.

It is certified that error appears in the above-identified patent and that said Letters Patent is hereby corrected as shown below:

Claims

Col. 7, line 17, claim 4, change "downstream lung" to --downstream lug--.

Signed and Sealed this
Third Day of May, 2016

Michelle K. Lee
*Director of the United States Patent and Trademark Office*